United States Patent
Turean et al.

(10) Patent No.: US 9,223,993 B2
(45) Date of Patent: Dec. 29, 2015

(54) METHOD FOR MANDATORY ACCESS CONTROL OF PROCESSING IN HARDWARE CORES

(71) Applicant: BROADCOM CORPORATION, Irvine, CA (US)

(72) Inventors: Flaviu Turean, Palo Alto, CA (US); Jaewon Shin, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 141 days.

(21) Appl. No.: 13/897,301

(22) Filed: May 17, 2013

(65) Prior Publication Data

US 2014/0310798 A1  Oct. 16, 2014

Related U.S. Application Data

(60) Provisional application No. 61/812,213, filed on Apr. 15, 2013.

(51) Int. Cl.
*G06F 12/00* (2006.01)
*G06F 21/60* (2013.01)

(52) U.S. Cl.
CPC ...... *G06F 21/606* (2013.01); *G06F 2221/2113* (2013.01)

(58) Field of Classification Search
CPC .............. G06F 21/6218; G06F 2221/2113; G06F 21/606

USPC .......................................................... 726/16
See application file for complete search history.

(56) References Cited

U.S. PATENT DOCUMENTS

| | | | | |
|---|---|---|---|---|
| 5,991,877 | A * | 11/1999 | Luckenbaugh | 726/1 |
| 6,289,462 | B1 * | 9/2001 | McNabb et al. | 726/21 |
| 6,931,411 | B1 * | 8/2005 | Babiskin et al. | |
| 6,950,824 | B1 * | 9/2005 | Babiskin et al. | 707/694 |
| 2005/0195811 | A1 * | 9/2005 | Wu et al. | 370/389 |
| 2005/0201273 | A1 * | 9/2005 | Shimizu | 370/216 |
| 2010/0088739 | A1 * | 4/2010 | Hall et al. | 726/1 |

* cited by examiner

*Primary Examiner* — Baotran N To
(74) *Attorney, Agent, or Firm* — McDermott Will & Emery LLP (57) ABSTRACT

A method for providing hardware mandatory access control (MAC) may include coupling an input filter to a hardware core. The input filter may receive one or more labeled objects and may qualify the labeled objects based on a first label associated with each of the labeled objects. The input filter may strip the first label from each of the labeled objects to provide one or more input objects. The hardware core may receive the one or more input objects and may provide one or more output objects. An output filter may be coupled to the hardware core. The output filter may receive the one or more output objects and may associate to each of the one or more output objects a second label. Operations of the input filter and the output filter may be coordinated by a label manager.

20 Claims, 5 Drawing Sheets

METHOD FOR MANDATORY ACCESS CONTROL OF PROCESSING IN HARDWARE CORES

CROSS-REFERENCE TO RELATED APPLICATIONS

This application claims the benefit of priority under 35 U.S.C. §119 from U.S. Provisional Patent Application 61/812,213 filed Apr. 15, 2013, which is incorporated herein by reference in its entirety.

TECHNICAL FIELD

The present description relates generally to signal processing hardware, and more particularly, but not exclusively, to a method for mandatory access control of processing in hardware cores.

BACKGROUND

Many systems use mandatory access control (MAC) to constrain a subject or an initiator from being able to access, use, or perform one or more operations on an object (e.g., data or software) or a target element of the system (e.g., a block, a unit, a module, a directory, etc.). In MAC, the restraining of access to an object may be based on the sensitivity (e.g., represented by a label) of the information contained in that object. The subjects may be formally authorized by, for example, obtaining clearance to access sensitive information contained in that object. For instance, an operating system may exert the access control to restrain the access to the object or the target element. Existing MAC has been defined primarily for software objects (e.g., files, directories, documents, etc.) and operating system concepts (e.g., TCP connections, group memberships, etc.).

Discretionary Access Control (DAC), on the other hand, may leave the subject in control of the processing rights and even of granting (e.g., transitively) such rights to other entities. DAC may have a number of disadvantages as compared to MAC. For example, in DAC, a compromised subject (e.g., a misconfigured or subverted software or buggy hardware) may allow objects to leak outside the compartment in which they are supposed to stay. For instance, a data block may be allowed by subverted software to be copied to a device that the device is not supposed to have access to.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

Figure 1:
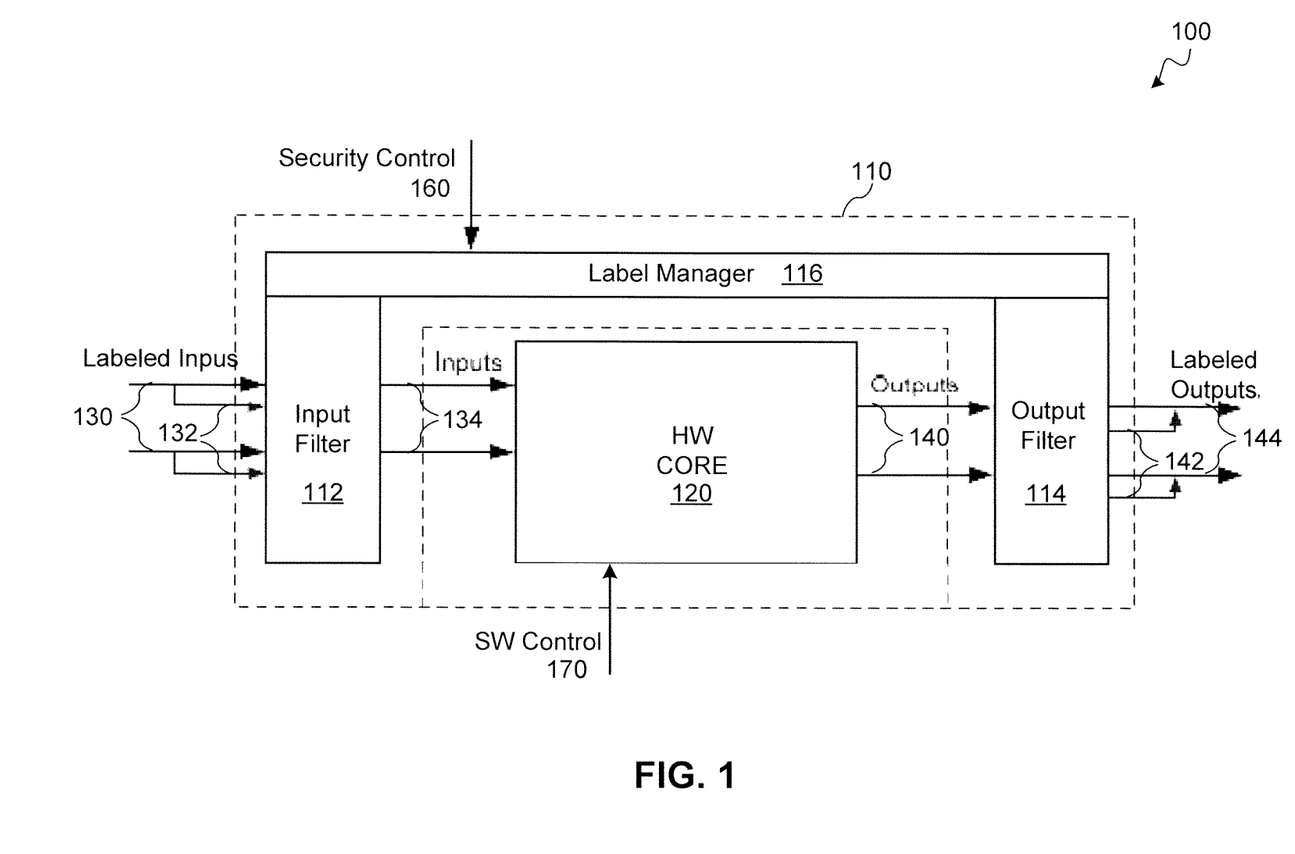
FIG. 1 illustrates an example of a device with hardware mandatory access control (MAC) in accordance with one or more implementations.

FIG. 1 illustrates an example of a device 100 with hardware mandatory access control (MAC) in accordance with one or more implementations of the subject technology. The device 100 may provide for restricting hardware (HW) core 120 to access and/or process data in certain security contexts, based on a MAC theory of operation. The HW core 120 may include, but is not limited to, data-processing HW cores such as video/audio and control signal processing HW cores. Implementation of the MAC may be complex because, as objects are processed by a subject core (e.g., a HW core, such as HW core 120), labels have to be preserved and propagated through the subject core. Further, for an existing core or for a large and complex core, the added burden of correctly processing the label and ensuring that the security process is operating correctly may not be a simple task, as it may resist easy formal analysis. The subject technology may provide for wrapping the HW core with HWMAC components without modifying the HW core or software that may control the HW core.

In one or more implementations of the subject technology, a HW core 120 may be wrapped with a HWMAC circuit 110 including, but not limited to, HWMAC components such as input filter 112, output filter 114, and label manager 116. The input filter 112 may be configured to receive one or more labeled objects 130 and to qualify each of the labeled objects 130 based on a first label 132 associated with the labeled object 130. The input filter 112 may strip the first label 132 from each labeled object 130 to provide one or more input objects 134. The HW core 120 may receive the input objects 134 and may provide one or more output objects 140. The output filter 114 may be configured to receive the output objects 140 and to associate to each output object 140 a second label 142 to generate labeled output objects 144. The label manager 116 may be configured to coordinate operations of the input filter 112 and the output filter 114.

In one or more implementations of the subject technology, each labeled object 130 may include, but is not limited to, a data item including a video sample, an audio sample, and a control command. The first label 132 may be a MAC label and may be configured to indicate a security context or a security compartment associated with the object. The security context may include one or more restrictions on the labeled object 130. The restrictions may include access restrictions, including restrictions on the HW cores and/or other HW/SW components that can access labeled object 130 and/or restrictions on the HW cores and/or the other HW/SW components that can be accessible to the labeled object 130. For instance, a video sample may include a label that defines the HW cores that the sample can access or specify the memory buffers that the video sample can be written to.

A security compartment may be an environment (e.g., an abstract environment) in which certain processing may take place. For example, the security compartment may be an environment including multiple HW cores with access to a number of HWMAC objects (e.g., data samples, DRAM bursts, and/or register values). The hardware cores not enlisted in a security compartment may not be allowed to access that security compartment. Security compartments may be disjoint (e.g., non-hierarchical) and enlisting of one or more HW cores to a security compartment may not be permanent and may be subject to change. As an example of the first label 132, video samples may each carry, in addition to a color component (and in some cases other attributes such as color space, sample density, picture-start, etc.) values, a field indicating an associated security compartment. The field indicating the associated security component may exemplify a MAC label with a security compartment. The input filter 112 may be configured to ensure that the labeled object 130 can be safely admitted for processing by the HW core 120.

In one or more implementations of the subject technology, the label manager 116 may be configured to maintain a current compartment (CC) variable that can hold information relating to a security compartment that the hardware core is currently operating in. When the HW core 120 is initialized, the label manager 116 may start with a CC=undeclared, indicating that an undeclared security compartment is the only available security compartment for the HW core 120 to operate in. The undeclared security compartment may include a compartment in which objects with no declared compartment or objects coming from a legacy (e.g., non-HWMAC) source may be operating. As a convention, CC variable values may be positive integer numbers, starting at 0. An undeclared security compartment may be assigned a CC=0, and a CC=1 may be set aside, for example, to be used for a specific memory region (e.g., current R-regions, where R-regions may have some access restrictions).

In one or more implementations, problems may arise when propagating and checking CC at the next sample of an object, or to input filters of different inputs, which may be working on different clocks. In this case, the mismatch of input label and CC may have triggered a rewrite-to-null, and some samples may not be re-written, and may find their way to the output (e.g., as an object from a different compartment that is leaked into this compartment). For example, this can indicate that delay lines may need to be inserted between where an object is accepted and the place where the conditional re-write happens, to provide additional time.

In some aspects, the number of anticipated compartments may dictate a width of the label field traveling with the objects. The label manager 116 may capture a compartment value from a first label 132 of a first labeled object 130 that is received at the input filter 112, and may change a value of the CC variable to a current value based on the captured compartment value. The captured compartment value may define the security compartment that the HW core 120 can operate in. In one or more implementations of the subject technology, the input filter 112 may check a subsequent labeled object 130 received at the input filter 112 against the current value of the CC variable. The input filter 112 may accept the subsequent labeled object 130 for processing in the HW core 120 only if the first label 132 of the subsequent labeled object 130 is consistent with the current value of the CC variable or indicates an undeclared security compartment.

The output filter 114 may associate each of the one or more output objects (e.g., processed) 140 with a second label 142 to generate a labeled output object 144. The second label 142 may be an indication of the current value of the CC variable. The output filter 114 may ensure that the output object 140 is permitted to leave the hardware core, based on the second label 114. The SW control 170 may provide control signals to the HW core 170 that can assist in processing of the inputs 134. The security control 160 is received by the label manager 116 from a security manager as discussed herein with respect to FIG. 2.

Figure 2:
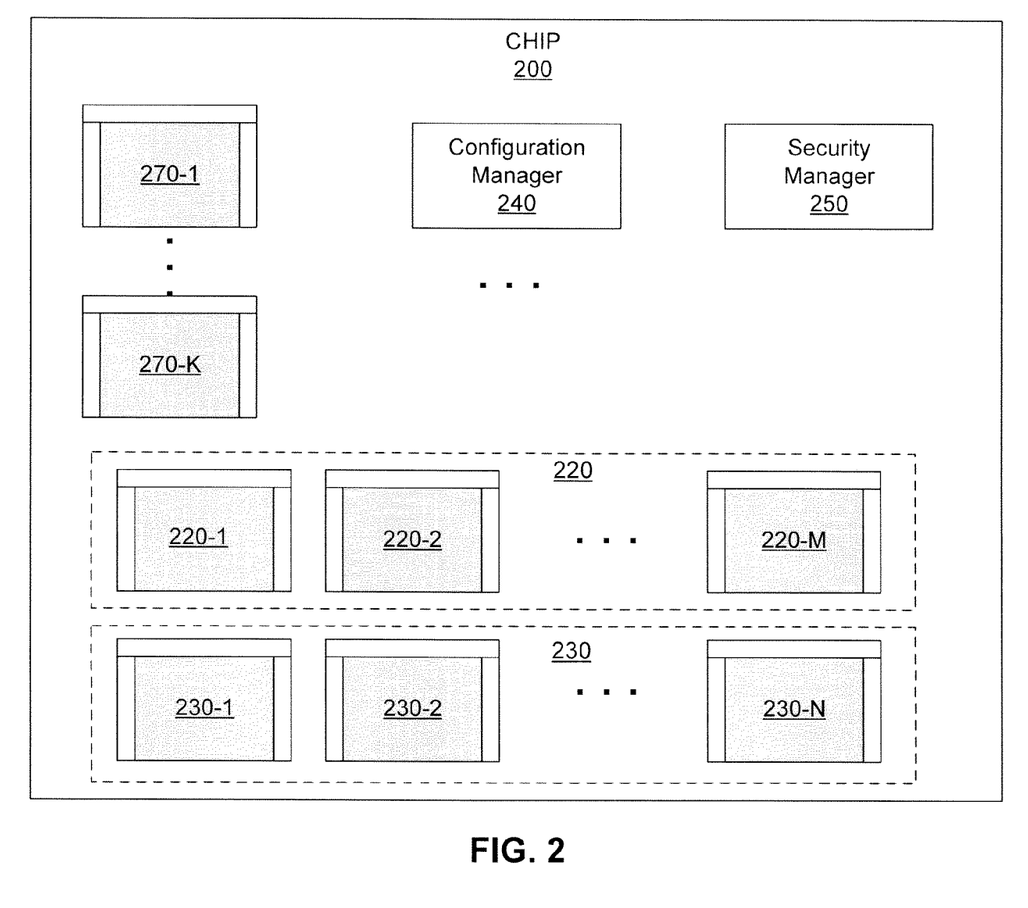
FIG. 2 illustrates an example of a chip using a number of the devices of FIG. 1 in accordance with one or more implementations.

FIG. 2 illustrates an example of a chip 200 using a number of the devices 100 of FIG. 1 in accordance with one or more implementations of the subject technology. The chip 200 may include a number of devices 270-1 to 270-K, 220-1 to 220-M, and 230-1 to 230-N similar to device 100 each including a HW core (e.g., HW core 120 of FIG. 1) wrapped with a HWMAC circuit (e.g., 110 of FIG. 1). The chip 200 may further include a configuration manager 240 and a security manager 250. In one or more implementation of the subject technology, the devices 220-1 to 220-M, and 230-1 to 230-N may operate under security compartments 220 and 230, respectively. Each of the security compartments 220 and 230 may be dedicated to a specific logical pipeline of consecutive functionalities which are configured by the configuration manager 240.

For example, the configuration manager 240 may arrange a number of devices such as 220-1 to 220-M to perform a chain of processing on a data sample and have secure access to a certain data objects or resources or be securely accessible to specific devices and/or software. For example, the data sample may be video sample and the devices in the security compartment 220 may perform various processing (e.g., decoding, scaling, sharpness enhancing, etc.) on the video sample. The security manager 250 may be responsible for enforcing the security measures set by the configuration manager 240. The security manager 250 may enforce the security measures by sending security control 160 of FIG. 1 to the label manager 116 of FIG. 1. The arrangement of various devices into security compartments may be dynamic and can change with time. For example, the device 220-2 may, in a later time, be configured into another security compartment with other device. At any moment, there may be a number of the devices (e.g., 270-1 to 270-K) on the chip 200 that are not part of any security compartment. The number of security compartments on a chip may change over the time and may not be limited to any specific number.

Figure 3:
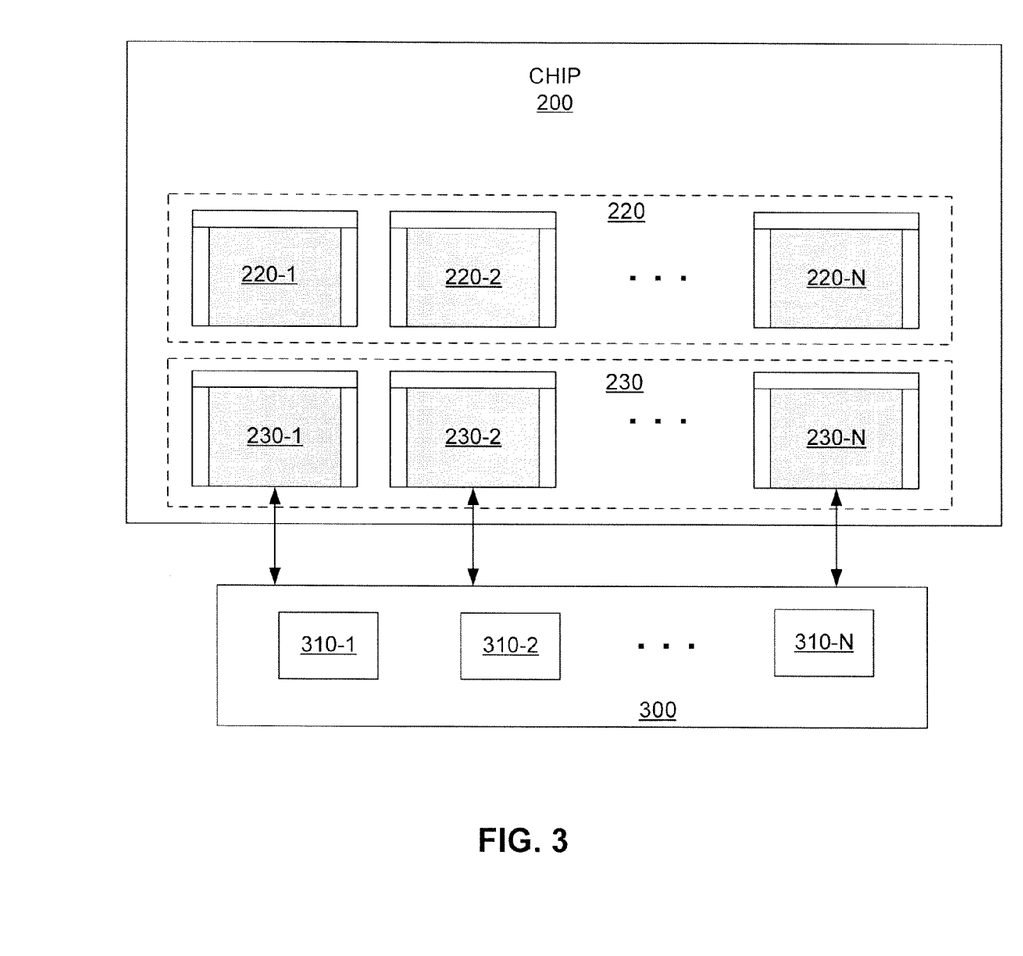
FIG. 3 illustrates an example of the chip of FIG. 2 accessing a memory chip in accordance with one or more implementations.

FIG. 3 illustrates an example of the chip 200 of FIG. 2 accessing a memory chip 300 in accordance with one or more implementations of the subject technology. One aspect of the idea of formation of a security compartment is to define restrictions in access to resources such as memory chips (e.g., a dynamic random access memory (DRAM) chips). For example, various portions (e.g., buffers) 310-1 to 310-N of the memory chip 300 may be restricted to a specific security compartment (e.g., 220 or 230) or a portion of a security compartment for specific interaction. For example, the device 230-1 of the security compartment 230 may have a write access to the memory buffer 310-1 and the same memory buffer (e.g., 310-1) may be accessible to the device 230-2 of the same compartment 230, only for read operation. As mentioned before, the access rights may be defined by the configuration manager (e.g., 240 of FIG. 2) and be enforced by the security manager 250 of FIG. 2.

For example, when a device of a security compartment (e.g., 230-2) performs a memory read, a checker in the input Filter 112 of FIG. 1 may verify that the device, when operating in the current compartment (e.g., 230) is allowed to read from the requested address of the memory buffer 310-1. The input Filter 112 may look for a match of the CC as well as the Address. In one or more implementations, the input filter 112 may hold multiple CCs and Addr_Range tuples. Each memory request may need to have a matching CC and have an address that falls within the Addr_Range. Alternatively, when CC=undeclared, Address may not be checked. If no match exits, the memory request may not be initiated and a null element (e.g., gray sample values; or all-zero) may be returned to the HW core of the device. Write operations can be performed similarly. For example, if CC in the write request does not match with the current security compartment (e.g., 230) value and address does not fall into an address-range of Addr_Range, the write request may not be initiated.

In one or more aspects, the HWMAC circuit 110 of FIG. 1 may prevent the control software 170 from impermissible acts including programming one or more control registers of the HW core (HW core 120 of FIG. 1, or HW core of any of the devices on chip 200) to write output data to untrusted memory regions (e.g., of the memory chip 300), or to read regions of the memory chip 300 to which the HW core is not supposed to access.

In one or more implementations, large systems can be constructed with the HWMAC mechanism, which can be effective if an object's compartment can be enforced throughout. This may not be possible if labels are dropped before feeding a data sample to the next device (e.g., HWMAC wrapped HD core). In one or more implementations, there may be mixed-compartment situations. For example, a device (e.g., a compositor) may take a video surface, such as a premium video channel, and a graphics surface including subtitles. The video surface and the graphics surface may come from different entities (e.g., a video decoder, an application, etc.), may be processed in different compartments, and may need to be superimposed into a single screen image. The superimposition may operate in its own compartment. The input filter 112 may have a re-write capability (e.g., of a labeled object), in which input filter 112 may use, for example, a look-up table to search for a translation for an input label (e.g., 132 of FIG. 1). Input labels not present in the look-up table may enter un-translated, but may still be subject to CC check. The look-up may be controlled for secure programming, but may not need to be updated frequently. The look-up table may be updated only when compartments get re-drawn by the configuration manager 240 of FIG. 2. The compositor device discussed above, for example, may have separate look-up tables for video and graphics paths that correspond to different compartments. In one or more aspects, the input filter 112 may use means other than a look-up table (e.g., one or more in-line verification mechanisms) to translate input labels.

Figure 4:
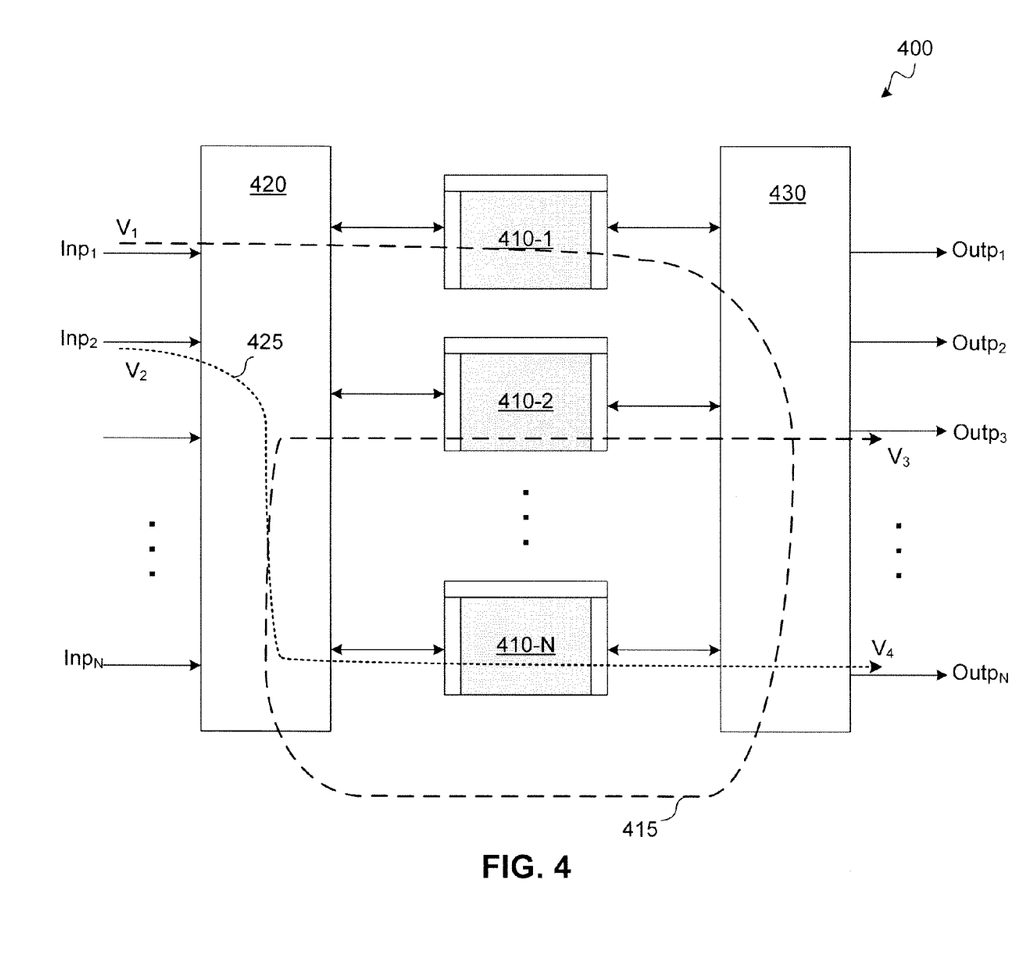
FIG. 4 illustrates an example of a processing system using a number of devices of FIG. 1 in accordance with one or more implementations.

FIG. 4 illustrates an example of a processing system 400 using a number of devices of FIG. 1 in accordance with one or more implementations of the subject technology. The processing system 400 may include a video network processor including switches 420 and 430 and a number of devices (e.g., HWMAP wrapped HW-cores) 410-1 to 410-N. The devices may include a scaler (e.g., 410-1), a sharpness enhancer (e.g., 410-2), a contract enhancer (e.g., 410-N), and so on. The processing system 400 may provide a physical realization of one or more logical pipelines. A first logical pipeline (e.g., shown by the broken line 415) may, for example, include a scalar and a sharpness enhancer. A video sample $V_1$ at a first input port (e.g., $Inp_1$) of the switch 420 may be directed by the switch 420 to an input of the device 410-1 (e.g., the scaler), and an output of the scaler may be fed back by the switches 430 and 420 to an input of the device 410-2 (e.g., the sharpness enhancer). An output video sample $V_3$ of the logical pipeline (e.g., including scaler and sharpness enhancer) can be accessed from an output port (e.g., $outp_3$ of $outp_1$-$outp_N$) of the switch 430.

The above-discussed logical pipeline may define an example of a security compartment, and the video sample $V_1$ may carry, in addition to color component values, a field (e.g., a label) indicating the associated security compartment (e.g., including devices 410-1 and 410-2). An input filter of the device 410-1 may strip the label and capture the associated security compartment from the label. The label manager of device 410-1 may update the CC to the associated security compartment. The output filter of the device 410-1 may provide a label indicating the current compartment to the output of the device 410-1. Similar procedure is performed at the device 410-2. In another example, a logical pipeline (e.g., shown by the dotted line 425) may include only device 410-N, where a video sample $V_2$ may enter an input (e.g., $inp_1$ of $inp_1$-$inp_N$ of the switch 420 and be directed to an input of the device 410-N (e.g., contrast enhancer), and an output of the device 410-N may be provided as a processed (e.g., contrast enhanced) video sample $V_4$ at an output $Outp_N$ of the switch 430. The security compartment in this case may include the contrast enhancer device 410-N. In one or more implementations, the output port of the switch 430 that the final output (e.g., $V_3$ or $V_4$) of the logical pipeline may be available is part of the security compartment.

Figure 5:
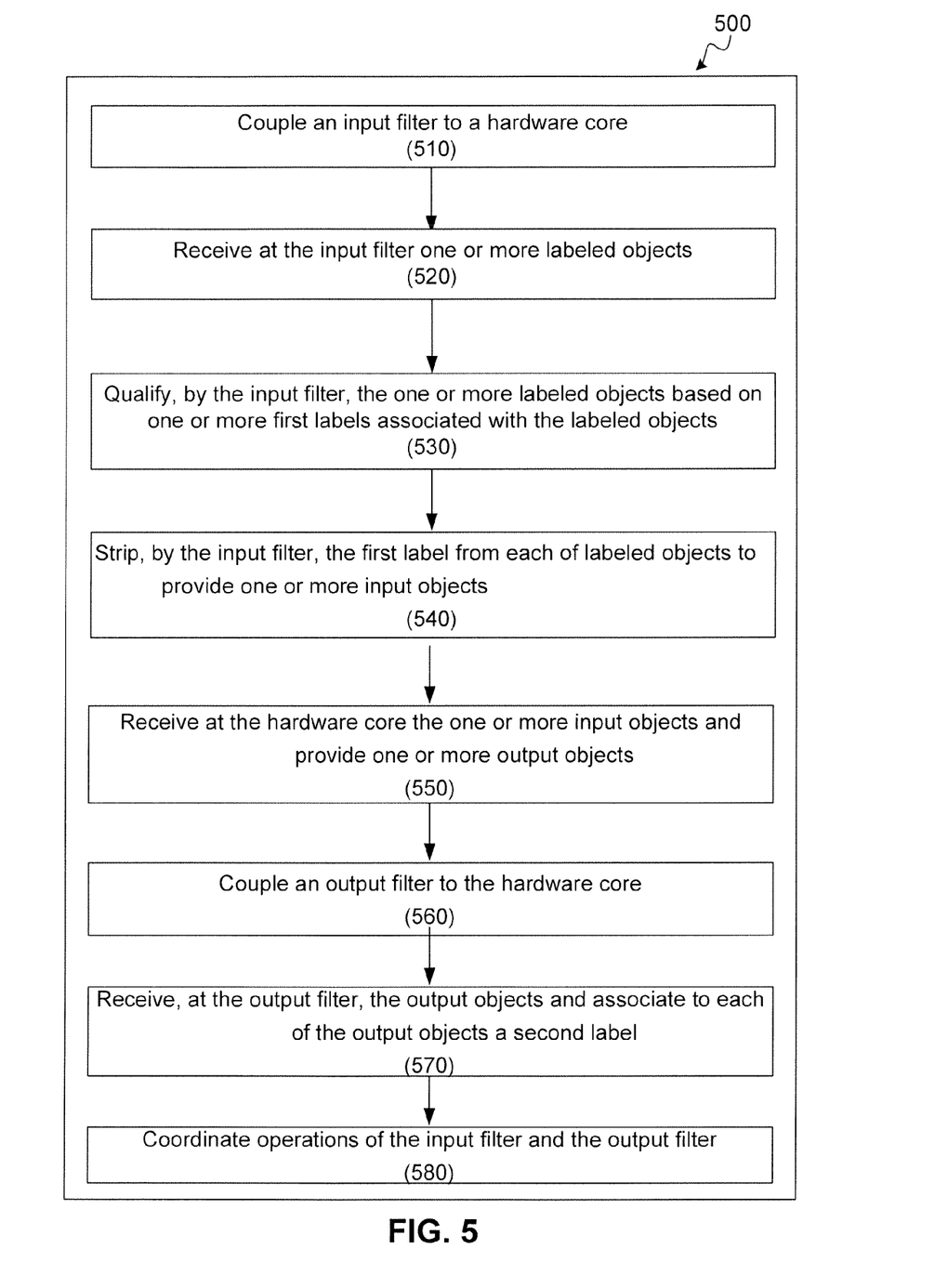
FIG. 5 illustrates an example of a method for providing a hardware MAC in accordance with one or more implementations.

FIG. 5 illustrates an example method 500 for providing a hardware MAC (e.g., 110 of FIG. 1) in accordance with one or more implementations of the subject technology. At operation block 510, an input filter (e.g., 112 of FIG. 1) may be coupled to a hardware core (e.g., 120 of FIG. 1). At the input filter, at operation block 520, one or more labeled objects (e.g., 130 of FIG. 1) may be received. At operation block 530, the one or more labeled objects may be qualified, by the input filter, based on one or more first labels (e.g., 132 of FIG. 1) associated with the one or more labeled objects. At operation block 540, the one or more first labels may be stripped, by the input filter, from the one or more labeled objects to provide one or more input objects (e.g., 134 of FIG. 1). At operation block 550, at the hardware core, the one or more input objects may be received and one or more output objects (e.g., 140 of FIG. 1) may be provided. An output filter (e.g., 114 of FIG. 1) may be coupled, at operation block 560, to the hardware core. At operation block 570, the one or more output objects may be received at the output filter, and to each of the output objects, a second label (e.g., 142 of FIG. 1) may be associated. At operation block 580, operations of the input filter and the output filter may be coordinated (e.g., by the label manager 116 of FIG. 1).

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device with hardware mandatory access control (MAC), the device comprising:
    an input filter configured to:
        receive at least one labeled object,
        qualify the at least one labeled object for processing based on at least one first label associated with the at least one labeled object, wherein the input filter is configured to qualify the at least one labeled object for processing when the at least one first label is consistent with a current value of a current compartment (CC) variable, and
        strip the at least one first label from the at least one labeled object to provide at least one input object; and
    a hardware core configured to receive the at least one input object for processing and to provide at least one output object, wherein the CC variable holds information relating to a security compartment that the hardware core is currently operating in.

2. The device of claim 1, wherein the at least one first label comprises a MAC label and is configured to indicate at least one of a security context or a security compartment associated with the object, wherein the at least one labeled object is a data item comprising a video sample, an audio sample, and a control command, and wherein the security compartment is an environment comprising a plurality of hardware cores with access to a number of hardware (HW) MAC objects.

3. The device of claim 1, further comprising an output filter configured to receive the at least one output object and to associate to each of the at least one output object a second label.

4. The device of claim 1, wherein the input filter is configured to qualify the at least one labeled object by ensuring safety of admitting the at least one labeled object for processing by the hardware core.

5. The device of claim 1, further comprising a label manager configured to coordinate operations of the input filter and the output filter, wherein the label manager is configured to maintain the current compartment (CC) variable.

6. The device of claim 5, wherein the label manager is further configured to:
    start with a value of the CC variable=undeclared when the core is initialized;
    capture a compartment value from a first label of a first labeled object received at the input filter; and
    change the value of the CC variable to a current value based on the captured compartment value.

7. The device of claim 6, wherein the input filter is further configured to check a subsequent labeled object received at the input filter against the current value of the CC variable and to accept the subsequent labeled object only if a first label of the subsequent labeled object is consistent with the current value of the CC variable or indicates an undeclared security compartment.

8. The device of claim 6, wherein the output filter is further configured to:
    associate to each of the at least one output object the second label that is an indication of the current value of the CC variable; and
    ensure that the at least one output object is permitted to leave the hardware core, based on the second label.

9. The device of claim 1, wherein the hardware core is further configured to receive a control signal from control software, and wherein the HWMAC prevents the control software from impermissible acts including programming control registers to write output data to untrusted memory regions, or to read memory regions to which the core is not supposed to access.

10. A method for providing hardware mandatory access control (MAC), the method comprising:
coupling an input filter to a hardware core;
receiving at the input filter at least one labeled object;
qualifying, by the input filter, the at least one labeled object based on at least one first label associated with the at least one labeled object, wherein qualifying the at least one labeled object comprises accepting the at least one first label object for processing when the at least one first label is consistent with a current value of a current compartment (CC) variable, and wherein the CC variable holds information relating to a security compartment that the hardware core is currently operating in;
stripping, by the input filter, the at least one first label from the at least one labeled object to provide at least one input object; and
receiving at the hardware core the at least one input object for processing and providing at least one output object.

11. The method of claim 10, wherein receiving the at least one first label comprises receiving a MAC label that indicates at least one of a security context or a security compartment associated with the object, and wherein qualifying the at least one labeled object comprises qualifying a data item comprising a video sample, an audio sample, and a control command, wherein the security compartment comprises an environment including a plurality of hardware cores with access to a number of hardware (HW) MAC objects.

12. The method of claim 10, further comprising:
coupling an output filter to the hardware core; and
receiving, at the output filter, the at least one output object and associating to each of the at least one output object a second label.

13. The method of claim 10, wherein qualifying the at least one labeled object comprises ensuring safety of admitting the at least one labeled object for processing by the hardware core.

14. The method of claim 10, further comprising coordinating operations of the input filter and the output filter, wherein coordinating operations of the input filter and the output filter comprises maintaining the current compartment (CC) variable.

15. The method of claim 14, wherein coordinating operations of the input filter and the output filter further comprises:
starting with a value of the CC variable =undeclared when the core is initialized;
capturing a compartment value from the a first label of a first labeled object received at the input filter; and
changing the value of the CC variable to a current value based on the captured compartment value.

16. The method of claim 15, further comprising checking a subsequent labeled object received at the input filter against the current value of the CC variable and accepting the subsequent labeled object only if a first label of the subsequent labeled object is consistent with the current value of the CC variable or indicates an undeclared security compartment.

17. The method of claim 15, wherein associating the second label comprises associating a label that is an indication of the current value of the CC variable; and wherein the method further comprises ensuring that the at least one output object is permitted to leave the hardware core, based on the second label.

18. The method of claim 10, further comprising:
receiving, at the hardware core, a control signal from a control software; and
preventing the control software from impermissible acts including programming control registers to write output data to untrusted memory regions, or to read memory regions to which the core is not supposed to access.

19. A hardware mandatory access control (MAC) circuit, the circuit comprising:
an input filter for coupling to a hardware core, the input filter configured to:
receive at least one labeled object,
qualify the at least one labeled object for processing based on at least one label associated with the at least one labeled object, wherein the input filter is configured to qualify the at least one labeled object for processing when the at least one first label is consistent with a current value of a current compartment (CC) variable, and wherein the CC variable holds information relating to a security compartment that the hardware core is currently operating in, and
strip the at least one first label from the at least one labeled object to provide at least one input object for the hardware core; and
an output filter for coupling to the hardware core, the output filter configured to receive the at least one output object from the hardware core and to associate to each of the at least one output object a second label.

20. The MAC circuit of claim 19, further comprising a label manager configured to coordinate operations of the input filter and the output filter,
wherein:
the input filter is configured to qualify the at least one labeled object by ensuring safety of admitting the at least one labeled object for processing by the hardware core,
the label manager is configured to maintain the current compartment (CC) variable,
the label manager is further configured to:
start with a value of the CC variable=undeclared when the core is initialized;
capture a compartment value from the a first label of a first labeled object received at the input filter; and
change the value of the CC variable to a current value based on the captured compartment value,
the input filter is further configured to check a subsequent labeled object received at the input filter against the current value of the CC variable and to accept the subsequent labeled object only if a first label of the subsequent labeled object is consistent with the current value of the CC variable or indicates an undeclared security compartment,
the output filter is further configured to associate to each of the at least one output object the second label that is an indication of the current value of the CC variable; and to ensure that the at least one output object is permitted to leave the hardware core, based on the second label, and
the HWMAC circuit is configured to prevent impermissible acts by control software, including programming control registers to write output data to untrusted memory regions, or to read memory regions to which the core is not supposed to access.

* * * * *